(No Model.)
C. L. WAGANDT.
SOLDERING APPARATUS.
No. 477,090. Patented June 14, 1892.
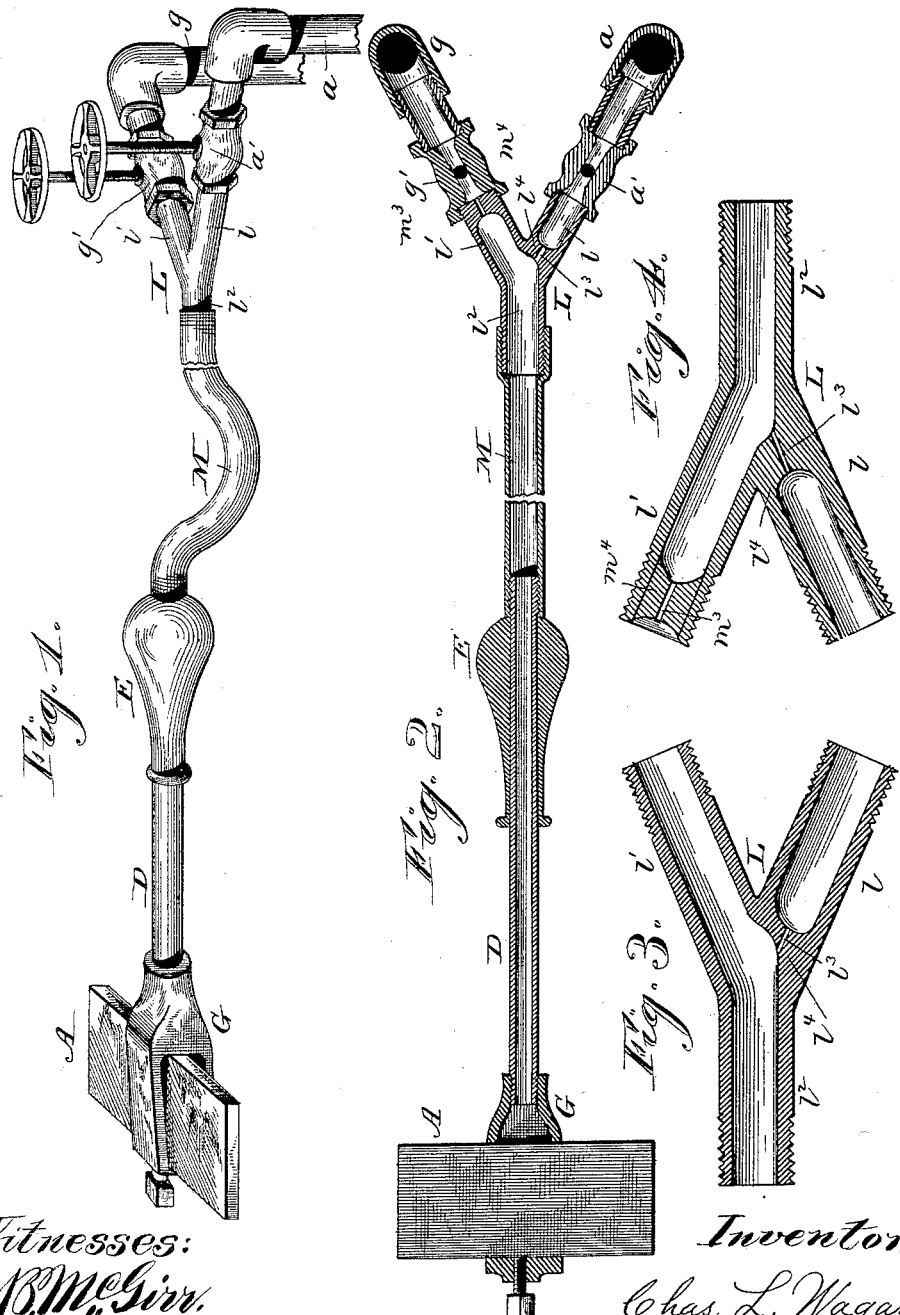
Witnesses:
J. B. McGirr.
E. K. Sturtevant.
Inventor:
Chas. L. Wagandt.
by Smith & Low
Attorneys

UNITED STATES PATENT OFFICE.

CHARLES L. WAGANDT, OF BALTIMORE, MARYLAND, ASSIGNOR OF ONE-HALF TO KEEN & HAGERTY, OF SAME PLACE.

SOLDERING APPARATUS.

SPECIFICATION forming part of Letters Patent No. 477,090, dated June 14, 1892.

Application filed December 12, 1888. Serial No. 293,386. (No model.)

*To all whom it may concern:*

Be it known that I, CHARLES L. WAGANDT, a citizen of the United States, residing in the city of Baltimore and State of Maryland, have invented certain new and useful Improvements in Soldering Apparatus; and I do declare the following to be a full, clear, and exact description of the invention, such as will enable others skilled in the art to which it appertains to make and use the same.

My present invention relates to that class of soldering apparatus in which the soldering block or tip is heated to and maintained at the requisite temperature by means of a flame arising from the combustion of a mixture of air and inflammable gas, such as ordinary illuminating-gas.

My invention is also applicable to soldering apparatus in which the solder is fused by the direct action of a flame issuing from a burner of suitable construction without the intervention of the soldering block or tip.

It is the object of my invention to minimize the quantity of gas required by mixing it with atmospheric air in such manner and in such relative proportion as to obtain a much greater heating efficiency than has been heretofore attained in these implements, at the same time securing complete combustion. These results are attained by the peculiar construction of connection or Y, hereinafter described, in combination with suitable devices for utilizing and applying to the purpose of soldering the flame produced, by which a combustible gas under a very slight pressure is so acted upon by a jet of compressed atmospheric air under a relatively heavy pressure as to produce a flame which gives a heat many times greater than I have been able to secure with the same expenditure of fuel in any of the many soldering apparatus which I have used. The complete combustion attained also prevents the deposit of carbon by the flame.

By my invention, also, the waste of gas by careless workmen will be prevented.

It will be understood that I do not confine myself to the exact construction hereinafter, for the sake of illustration, set forth, as my improvements may be otherwise availed of.

In order to make my invention more clearly understood, I have shown in the accompanying drawings a means for carrying the same into effect.

In said drawings, Figure 1 is a perspective view of a soldering apparatus embodying my invention. Fig. 2 is a sectional view of the same. Fig. 3 is a sectional view, on a larger scale, of a slightly-modified form of Y. Fig. 4 is a similar view, on a larger scale, of the Y shown in Fig. 2.

Referring to the drawings, A indicates the soldering block or tip, consisting, preferably, of copper, and secured in a suitable holder G. The flame is contained within or issues from said holder in such manner as to heat the tip A to and maintain it at the necessary temperature.

E represents the handle, and D the shank, by means of which the holder G, with its soldering-tip, is manipulated.

At $g$ is shown the gas-conduit, the supply for which may be derived from any suitable generator or ordinary illuminating-gas service-pipe, and at $a$ is indicated the air-conduit leading from an air-compressor or compressed-air reservoir.

It will be understood that according to my invention the gas employed is under a very slight pressure—simply sufficient to produce the necessary flow and supply—while the air is under a pressure of from fifteen to twenty pounds. The said air and gas pipes $a$ and $g$ terminate in a connection or Y, (indicated at L,) provided with three pipes or branches $l\,l'\,l^2$. The first two $l\,l'$ are connected with the said pipes $a\,g$, receive therefrom the air and gas, and deliver the same to the single branch $l^2$. The delivery end or orifice $l^3$ of branch $l$, however, is of small area compared with the chamber of branch $l^2$ and delivers the compressed air in a fine and strong jet into the slowly-moving column or stream of gas which enters said chamber of branch $l^2$ from branch $l'$. The air thus mingles thoroughly with the gas and carries it forward to the point of combustion, resulting in a flame which has a remarkable heating efficiency. For the best practical results the relative internal diameters of branch $l^2$, compared with that of the delivery-orifice of branch $l$ are five-sixteenths of an inch to No. 17 wire gage, substantially. In branches $l\,l'$ of the connection L or in the pipes $a\,g$, within convenient reach of the hand of the operator, are valves $a'\,g'$—such as ordinary globe-valves—by which the amounts of air and gas may be independently regulated. The inflammable mixture passes from the branch $l^2$ to the point of combustion by any suitable conduit M. Where the soldering-tool is to be manipulated by hand, such conduit will be of the usual flexible type, such as is indicated in the drawings, and said conduit may deliver the mixture to the tubular shank D, which passes through the handle of the tool, as illustrated, or may conduct it directly to the holder which carries the soldering block or tip, as shown in my patent, No. 379,141, dated March 6, 1888. Where the soldering-tool is not required to be so manipulated, the conduit M may be rigid and serve as a means for holding the tool in proper position, or the branch $l^2$ may be applied directly to the rear end of shank D.

In the construction shown the connection L consists of a single piece of metal cast in form and having a transverse partition $l^4$ in branch $l$, through which partition the orifice $l^3$ is bored. The branch $l'$, through which the gas is supplied, is also preferably provided with a partition $m^4$ and contracted passage or passages, as shown in Figs. 2 and 4. Such construction renders it impossible for the gas to be wasted by careless workmen, and I regard it as the most efficient form of the connection. The partitions may be formed, if desired, and those at the outer ends of the branches may most conveniently be so produced by inserting plugs, as indicated in Fig. 4. The partition $m^4$ with its contracted passage or passages may be arranged at a short distance from the point of meeting of branches $l$ and $l'$, as shown in Fig. 4. I have obtained good results, though not the best, with the construction shown in Fig. 3, in which the partition and contracted passage of the gas-supply branch $l'$ are omitted. When both of the partitions $l^4$ and $m^4$ are placed at or near the juncture of the air and gas branches, a gas-jet, though one of a weak character, is formed at or near the point of entrance of the strong air-jet, and unless great care is exercised in boring the apertures through the partitions, so as to properly locate them, the air-jet will not properly strike the gas-current and will cut off the gas-supply or fail to mix properly with it and inferior results are produced in heating the soldering-tool.

Having thus described my invention, what I claim, and desire to secure by Letters Patent, is—

1. In a soldering apparatus, the combination, with the soldering tip or burner and a conduit leading thereto, of the Y connection L, having the part or limb $l'$, adapted to receive the gas-supply, and the part $l$, provided at the point of union of said parts with the air-jet orifice $l^3$ of small area relative to the area of the part $l'$, substantially as set forth.

2. In a soldering apparatus, the combination of a soldering tip or burner, a conduit leading thereto, the connection L, having the pipe $l^2$ joined to said conduit and provided with the branch or limb $l'$, of relatively large area, and the branch or limb $l$, having the fine-jet orifice $l^3$ situated at the point of union of said branches, and the valves $a'\,g'$ for independently regulating the air and gas supplied to said branches, substantially as set forth.

3. In a soldering apparatus, the Y connection L, having the delivery-pipe $l^2$, the air-supply branch $l$, provided with the partition $l^4$ and air-jet orifice $l^3$ at its junction with said delivery-pipe, and the gas-supply branch $l'$, having the partition $m^4$ and regulating-jet orifice $m^3$ situated at a distance from the junction of said branches and from said orifice $l^3$, substantially as set forth.

4. In a soldering apparatus, a Y or connection having the delivery-pipe $l^2$, the air-pipe $l$, provided with the fine-jet orifice $l^3$ immediately at the branching point of the Y, and the gas-pipe $l'$, provided with the perforated partition $m^4$, situated at a distance back from said branching point, substantially as set forth.

In testimony whereof I affix my signature in the presence of two witnesses.

CHARLES L. WAGANDT.

Witnesses:
JNO. T. MADDOX,
H. N. LOW.